(12) United States Patent  
Dougherty

(10) Patent No.: US 8,969,756 B2
(45) Date of Patent: Mar. 3, 2015

(54) LASER CUTTING SYSTEM

(75) Inventor: Thomas J. Dougherty, Waukesha, WI (US)

(73) Assignee: Johnson Controls—SAFT Advanced Power Solutions LLC, Wilmington, DE (US)

( * ) Notice: Subject to any disclaimer, the term of this patent is extended or adjusted under 35 U.S.C. 154(b) by 194 days.

(21) Appl. No.: 12/637,578

(22) Filed: Dec. 14, 2009

(65) Prior Publication Data

US 2010/0163538 A1 Jul. 1, 2010

Related U.S. Application Data

(63) Continuation of application No. PCT/US2008/060369, filed on Apr. 15, 2008.

(60) Provisional application No. 60/944,324, filed on Jun. 15, 2007.

(51) Int. Cl.
*B23K 26/00* (2014.01)
*B23K 26/14* (2014.01)
*B23K 26/02* (2014.01)
*B23K 26/12* (2014.01)

(52) U.S. Cl.
CPC ........... *B23K 26/1405* (2013.01); *B23K 26/023* (2013.01); *B23K 26/123* (2013.01); *B23K 2203/10* (2013.01); *B23K 2203/12* (2013.01)
USPC ................................ 219/121.67; 219/121.72

(58) Field of Classification Search
USPC ............... 219/121 L, 121 LM, 121.67, 121.7, 219/121.77, 121.68, 121.74, 121.84, 219/121.72, 121.6, 121.85, 161, 121.8; 269/21; 83/145, 152
See application file for complete search history.

(56) References Cited

U.S. PATENT DOCUMENTS

| | | | | |
|---|---|---|---|---|
| 4,319,120 A | * | 3/1982 | la Rocca | 219/121.84 |
| 4,431,899 A | * | 2/1984 | Racki et al. | 219/121.67 |
| 4,582,977 A | * | 4/1986 | Knutsson | 219/121.67 |
| 5,359,176 A | * | 10/1994 | Balliet et al. | 219/121.84 |
| 5,504,301 A | | 4/1996 | Eveland | |
| 5,565,120 A | * | 10/1996 | La Rocca | 219/121.72 |
| 5,734,146 A | * | 3/1998 | La Rocca | 219/121.72 |
| 5,906,760 A | * | 5/1999 | Robb et al. | 219/121.67 |
| 6,303,902 B1 | * | 10/2001 | Nakai et al. | 219/121.82 |

(Continued)

FOREIGN PATENT DOCUMENTS

| | | |
|---|---|---|
| CN | 1972039 A | 6/2012 |
| DE | 10 2004 059766 A1 | 6/2006 |
| GB | 2 332 637 A | 6/1999 |

(Continued)

OTHER PUBLICATIONS

International Search Report and Written Opinion for Application No. PCT/US2008/060369, dated Dec. 4, 2008, 11 pages.

(Continued)

*Primary Examiner* — Thien S Tran
(74) *Attorney, Agent, or Firm* — Foley & Lardner LLP

(57) ABSTRACT

A workpiece cutting apparatus includes a laser source, a first suction system, and a first finger configured to guide a workpiece as it moves past the laser source. The first finger includes a first end provided adjacent a point where a laser from the laser source cuts the workpiece, and the first end of the first finger includes an aperture in fluid communication with the first suction system.

18 Claims, 8 Drawing Sheets

(56) References Cited

U.S. PATENT DOCUMENTS

2002/0130116 A1*  9/2002  Lawson .................. 219/121.84
2012/0012570 A1   1/2012  Briand et al.

FOREIGN PATENT DOCUMENTS

WO    WO 03/051571  A1     6/2003
WO    WO 2004056685 A1 *   7/2004   ............. B65H 20/16

OTHER PUBLICATIONS

Office Action for European Application No. 08826172.2, dated Jun. 4, 2010, 3 pages.

Response to Office Action for European Application No. 08826172.2, dated Sep. 29, 2010, 9 pages.

Supplemental Response to Office Action for European Application No. 08826172.2, dated Oct. 1, 2010, 4 pages.

* cited by examiner

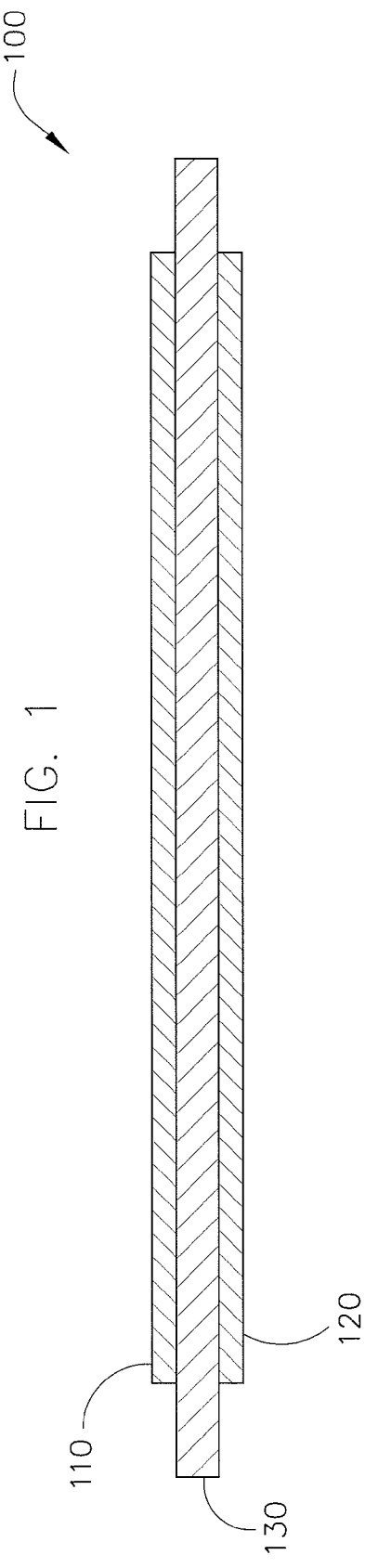
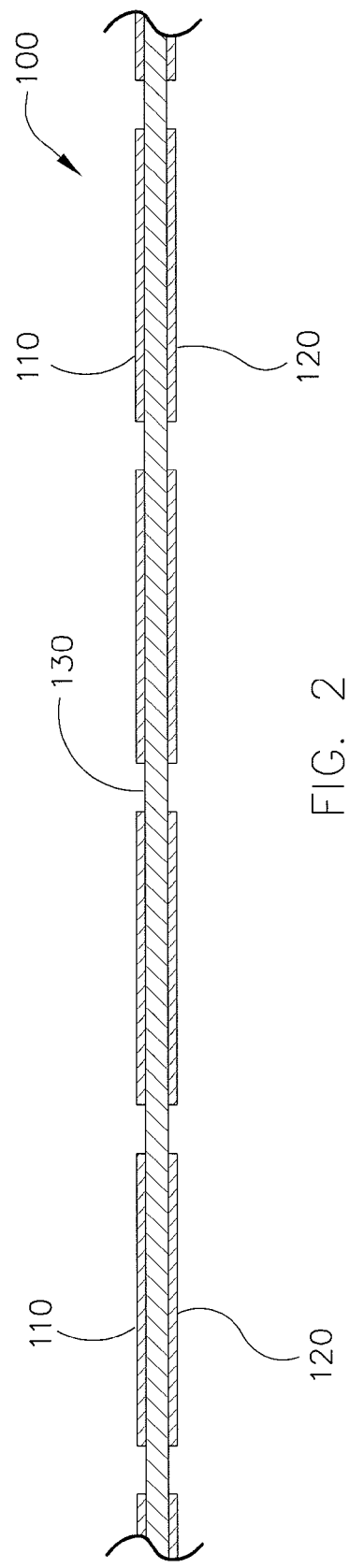

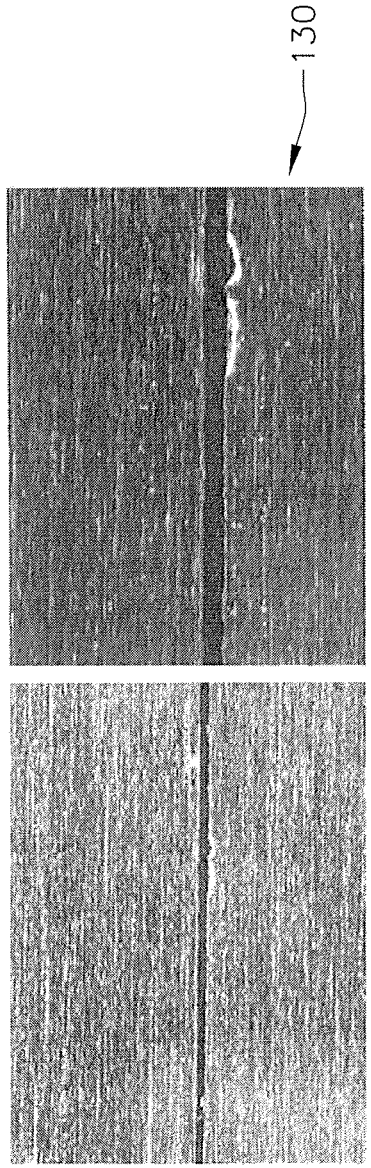
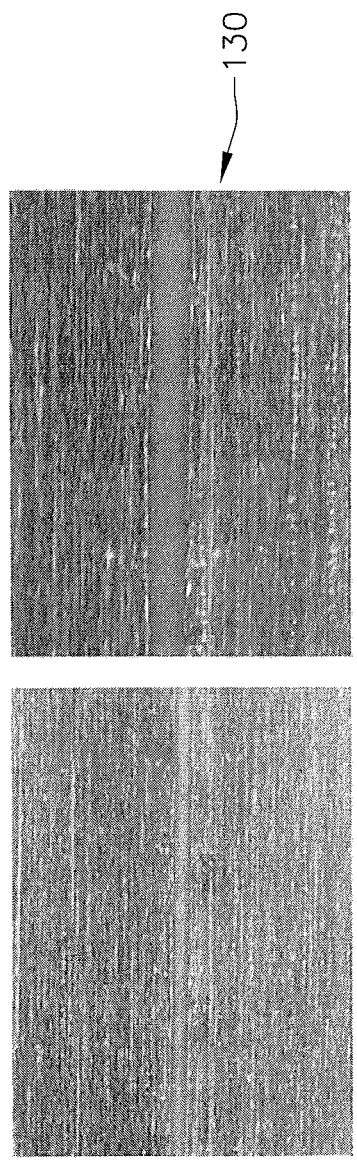

LASER CUTTING SYSTEM

CROSS-REFERENCE TO RELATED PATENT APPLICATIONS

This application is a continuation of International Patent Application No. PCT/US2008/060369, filed Apr. 15, 2008, which claims the benefit of and priority to U.S. Provisional Patent Application No. 60/944,324, filed Jun. 15, 2007. The disclosures of International Patent Application No. PCT/US2008/060369 and U.S. Provisional Patent Application No. 60/944,324 are incorporated by reference in their entirety.

STATEMENT OF GOVERNMENT RIGHTS

This invention was made with Government support under U.S. Department of Energy Cooperative Agreement No. DE-FC26-05NT42403 awarded by the U.S. Department of Energy. The Government has certain rights in this invention.

BACKGROUND

The present disclosure relates to a method and apparatus for cutting a workpiece. More particularly, it relates a method and apparatus for cutting battery electrodes using a laser.

It is known to provide batteries or cells for use in vehicles such as automobiles. For example, lead-acid batteries have been used in starting, lighting, and ignition applications. More recently, hybrid electric vehicles are being developed which utilize a battery (e.g., a lithium-ion or nickel-metal-hydride battery) in combination with other systems (e.g., an internal combustion engine) to provide power for the vehicle.

It is known to manufacture battery electrodes by coating active material on a conductor. Typically, the conductor is a metal conductive material or a composite material laminated with a metal conductive material. However, it would be economically advantageous to perform the coating process on a relatively large sheet of conductor in a continuous process. It would further be advantageous to fabricate relatively large pieces, often in the form of a long rolled sheet, of electrode material and subsequently cut them as desired.

It is known to use a blade to cut the conductor. However, the use of blades has limitations and drawbacks. Cutting with blades is often imprecise and unreliable, compromising the structural integrity and overall quality and performance of the electrode. Blade cutting of metals also frequently creates burrs that can result in short circuits in tightly packed battery cells.

It is also known to cut a substrate with a laser. Although laser cutting provides a more reliable cut, it also has drawbacks. Lasers use focused energy to rapidly melt the electrode, which can cause splattering of material from the cut zone to the surrounding electrode surfaces. Electrode material may also evaporate and recondense on the electrode surface. Because electrodes are tightly packed together, pieces of slag from the cut zone extending outward from the electrode surface increase the risk of short circuits between electrodes, which can lead to failure and overheating. Due to its relatively high temperature, the cutting debris can also melt and/or cover the active material creating a "dead spot" on the electrode surface (i.e., a location where electrochemical reactions cannot occur).

Accordingly, it would be advantageous to provide a method and apparatus for laser cutting that cleanly and precisely cuts electrodes and prevents cutting debris from being deposited on the electrode surface.

SUMMARY

One exemplary embodiment relates to a workpiece cutting apparatus includes a laser source, a first suction system, and a first finger configured to guide a workpiece as it moves past the laser source. The first finger includes a first end provided adjacent a point where a laser from the laser source cuts the workpiece, and the first end of the first finger includes an aperture in fluid communication with the first suction system.

Another exemplary embodiment relates to a workpiece cutting apparatus that includes a laser configured to cut a workpiece at a laser contact point. The apparatus also includes at least one member having a first end provided adjacent the laser contact point and configured to guide the workpiece as the workpiece passes the laser contact point, the at least one member having a first end that includes an opening positioned adjacent the laser contact point such that the at least one member is configured to remove debris from an area adjacent the laser contact point by suction.

Another exemplary embodiment relates to a method of cutting a workpiece including providing a workpiece and providing a laser source configured to cut the workpiece with a laser that impinges the workpiece at a laser contact point. The method also includes providing at least one finger having an end provided adjacent the laser contact point to guide the workpiece as the workpiece passes the laser contact point. The method further includes cutting the workpiece with the laser and suctioning debris from an area adjacent the laser contact point on a laser side of the workpiece using the at least one finger.

These and other features and advantages of various exemplary embodiments of systems and methods according to this invention are described in, or are apparent from, the following detailed descriptions of various exemplary embodiments of various devices, structures and/or methods according to this invention.

BRIEF DESCRIPTION OF THE DRAWINGS

Various exemplary embodiments of the systems and methods according to this invention will be described, with reference to the following figures, wherein:

FIG. 1 is a cross-sectional side view of an electrode;

FIG. 2 is a cross-sectional side view of a panel of electrodes;

FIGS. 10A and 10B are top views of conductor cut using a system according to an exemplary embodiment; and FIGS. 11A and 11B are top views of conductor cut using a system according to an exemplary embodiment of the present invention.

Figure 3:
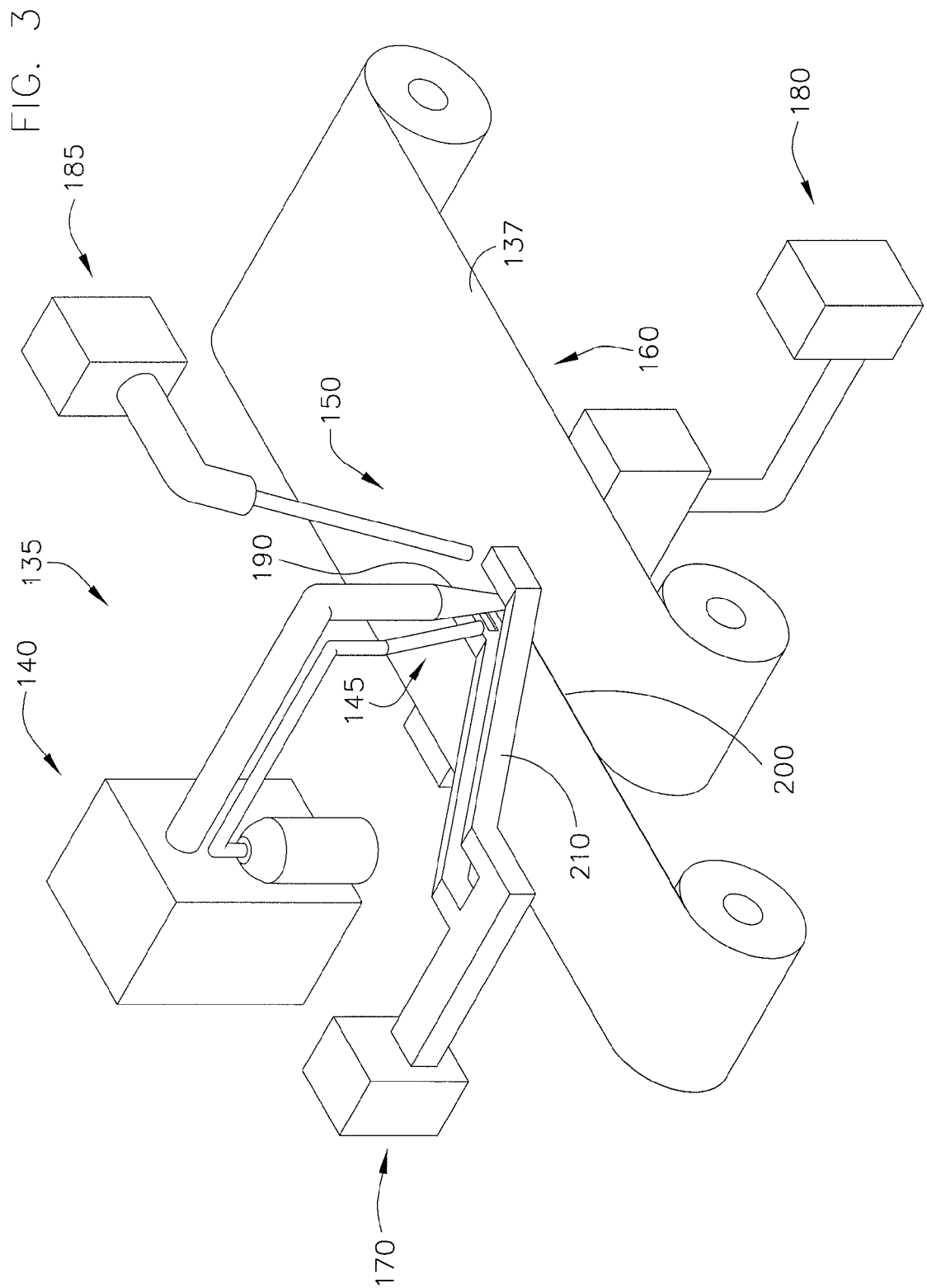
FIG. 3 is an isometric view of a portion of a laser cutting system according to a first exemplary embodiment.

It should be understood that the drawings are not necessarily to scale. In certain instances, details that are not necessary to the understanding of the invention or render other details difficult to perceive may have been omitted. In some cases, the components may be moved relative to one another (e.g., closer together or on opposite sides). It should be understood, of course, that the invention is not necessarily limited to the particular embodiments illustrated herein.

DETAILED DESCRIPTION

The present disclosure relates to a method and apparatus of cutting workpieces, including conductors with electrode material provided thereon. The disclosed method includes the use of a laser for cutting with additional components for helping control the workpieces and displacing cutting debris to prevent it from compromising or otherwise affecting the workpiece. In some embodiments, the disclosed method and apparatus are particularly adapted for use in cutting conductors and battery electrodes. Thus, the disclosed method and apparatus are described herein as applied to cutting conductors and/or electrodes. However, the applicability of the present disclosure is not limited to cutting only such materials, but may be applied to cutting anything with a laser.

The disclosed method and apparatus are particularly well-adapted to cutting a thin workpieces, e.g., a thin sheet of metal. The location of various components of various exemplary embodiments will be described herein with reference to a hypothetical workpiece being cut even though the workpiece does not necessarily comprise part of the exemplary embodiments described herein. For purposes of this disclosure, a workpiece (before or after cutting) has two opposite faces or sides (i.e., its thickness will be very small compared to one or both of its length or width). References to one "side" or the other of a workpiece refer to these faces or sides as described herein. In various embodiments, a laser source is deployed to one or the other side of a workpiece being cut. The side of the workpiece facing the laser source is referred to herein as the "laser side." The side opposite the laser side is referred to herein as the "exit side."

At any given point in the cutting process, the laser is focused on a point of the workpiece, which point varies relative to the workpiece over time (e.g, the workpiece moves relative to the laser). The approximate spot where the laser would contact a workpiece during cutting is referred to herein as the "laser contact point" or "cutting point." These terms may be used to describe the actual cutting point or a point where cutting would occur if a workpiece were present (i.e., the location of system components may be described in relation to the cutting point even though the workpiece is not necessarily a component of the exemplary embodiment described herein).

As described above, in various embodiments the laser contact point moves relative to a workpiece over time. In various embodiments, the workpiece may move relative to the laser contact point. For the purposes of this disclosure, a workpiece moves from "upstream" to "downstream." Thus, e.g., portions of the workpiece that have been cut are described herein as being "downstream" from the laser contact point and portions of the workpiece that are un-cut and/or will be cut are described herein as being "upstream" from the laser contact point.

Referring to FIG. 1, in one embodiment, an electrode 100 includes a positive electrode member 110 and negative electrode member 120 coupled to a conductor 130. In one embodiment, a first active material or positive electrode member 110 and/or a second active material or negative electrode member 120 are provided onto conductor 130 (e.g., by coating, lamination, etc.). Conductor 130 may be constructed of any number of conductive and/or metallic materials including, without limitation, aluminum, copper and/or an alloy comprising aluminum and/or copper. In connection with the manufacture of the electrode, it may be necessary or desirable to cut conductor 130.

For example, and referring to FIG. 2, during manufacture of one or more electrodes, in various embodiments, active material is formed on or otherwise provided on a sheet of conductor 130. The sheet of conductor 130 formed with active material may then be cut into individual electrodes 100.

Figure 4:
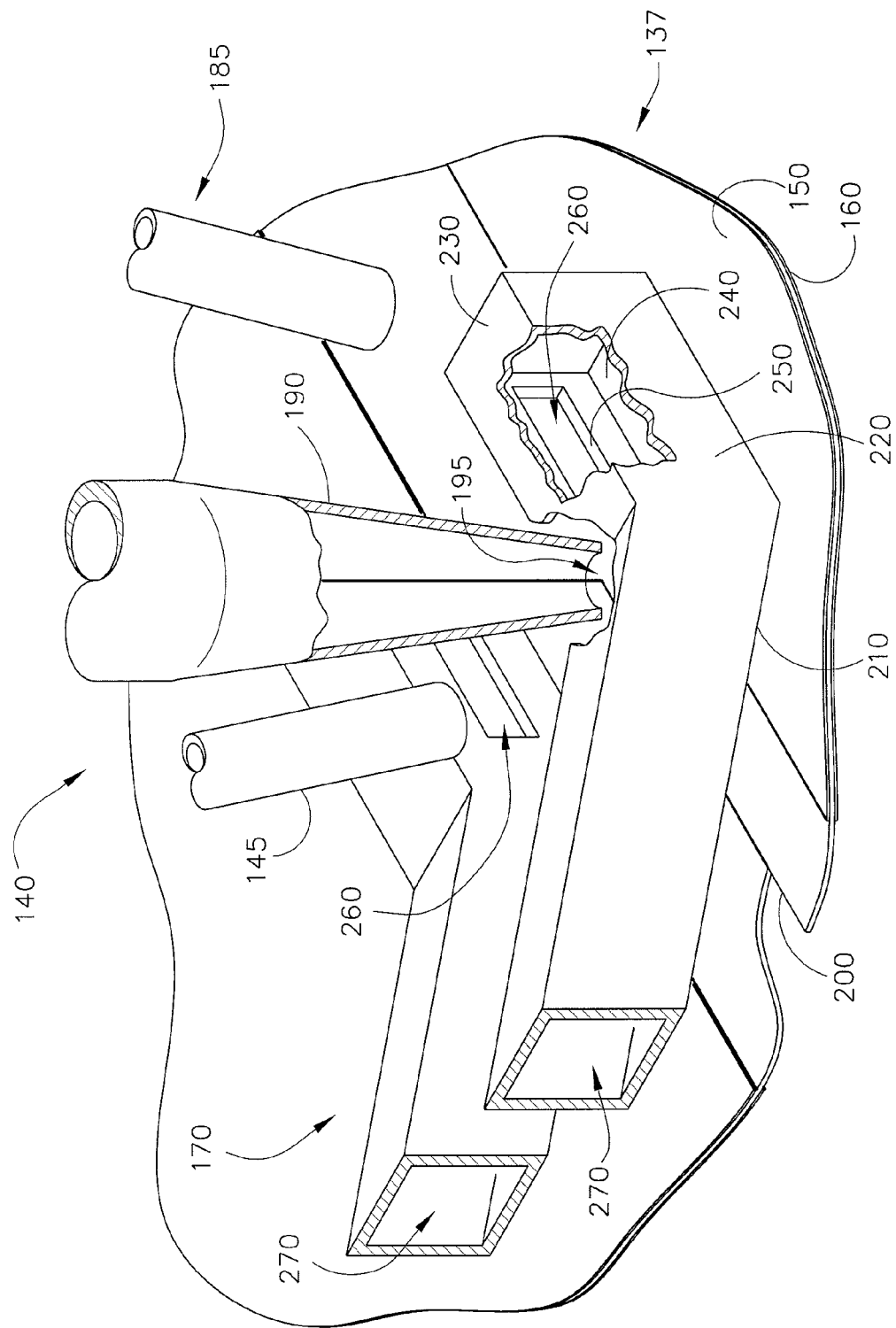
FIG. 4 is a partial isometric cutaway view of a portion of a laser cutting system according to a first exemplary embodiment.

Referring to FIGS. 3 and 4, in various embodiments, a laser cutting system 135 including a laser apparatus 140 is utilized to cut a workpiece 137. Laser apparatus 140 may include any laser with sufficiently high beam quality and high laser power to cut the particular workpiece. For example, in various exemplary embodiments, a diode laser such as that manufactured by SPI Lasers is utilized. A disk laser such as a Trumpf HDL 4002 disk laser may also be utilized. In various embodiments, laser apparatus 140 has a power range including from 70 watts to 350 watts. For example, the power range of laser apparatus 140 may include from 25 watts to 500 watts. In various exemplary embodiments, a laser apparatus 140 utilizes a narrow beam (e.g., a beam thickness of approximately 10 μm). A narrow beam may be advantageous in that a narrow beam typically burns off less material during cutting leaving a narrower cut 200. In various exemplary embodiments, laser apparatus 140 emits a constant laser beam.

In various embodiments, laser cutting system 135 does not generally require any unconventional modifications to existing laser apparatus 140. For example, various conventional optics, laser wavelengths, focal lengths and spot sizes may be utilized. In various embodiments, laser apparatus 140 has a wave length of approximately 1,030 to 1,035 nanometers, a focal length of approximately 80 mm, and a spot size of approximately 0.125 mm. In other embodiments, the laser apparatus has a focal length of approximately 1 mm. As one skilled in the art should appreciate, focal length is not a critical parameter in various embodiments.

Laser apparatus 140 may be operated at any suitable current level. In one exemplary embodiment, the laser apparatus is a 70 watt laser apparatus operated at 60 amps, but any laser may be utilized. In various exemplary embodiments, the laser used has a small spot size in order to minimize the amount of material burned off the workpiece.

In various embodiments, laser cutting system 135 and laser apparatus 140 are substantially fixed relative to workpiece 137. As shown in FIG. 3, in some embodiments, workpiece 137 is cut as it passes to and/or from a calendaring system (e.g., onto and/or off of rollers). In various embodiments, laser apparatus 140 may move relative to workpiece 137 and/or other components of laser cutting system 135.

Referring to FIGS. 3-7, in various embodiments, laser system 140 includes one or more fingers 210 positioned or otherwise provided along and/or substantially near a laser contact point 195. In various embodiments, one or more fingers 210 are positioned on or otherwise provided about laser side 150 of workpiece 137 substantially near a laser head 190. In various embodiments, one or more fingers may also be positioned on or otherwise provided about an exit side 160 of workpiece 137. In various embodiments, the one or more fingers are positioned downstream of the laser head. Each finger 210 is adapted to help hold workpiece 137 in a suitable position as it passes and to help prevent splash, dust, slag, debris, and/or other material resulting from the cutting process from adhering to, contacting, or otherwise compromising the quality of workpiece 137 or any portion of an electrode. The one or more fingers may overlap. In various embodiments, fingers 210 may be operatively connected or interconnected. However, it is not necessary that any of the fingers overlap or interconnect.

Each finger 210 may be of any number of various suitable shapes. As particularly illustrated in FIGS. 4 and 7, in various embodiments, each finger 210 is tubular, i.e., there is a conduit 270 defined within each finger 210 with at least one inlet or aperture 260 near its distal end substantially near laser cutting point 195. In various embodiments, the cross-sectional shape of at least the distal portion of one or more fingers 210 is characterized by a conduit or cavity defined by a central portion 220 and first and second, generally parallel, elongated leg portions 230/240 coupled to central portion 220. In one exemplary embodiment, first and second, generally parallel foot portions 250 are joined to the distal portion of each leg portion 230/240 opposite the juncture with central portion 220. In one embodiment, profiled finger 210 cross-section defines an open portion or conduit 270. The open portion or conduit 270 is bound on three sides by leg portions 230/240 and central portion 220. In various embodiments, each foot portion 250 is oriented in a substantially side-by-side relationship defining at least one inlet or aperture 260 between confronting surfaces of the foot portions 250 leading to conduit 270. In one embodiment, each foot portion 250 defining aperture 260 is positioned on the side of finger 210 nearest the path of a laser beam from laser head 190. At least the distal portion of each finger 210 may be of any other suitable cross-sectional shapes including, without limitation, U-shaped, J-shaped, L-shaped, C-shaped, I-shaped, and/or V-shaped.

In one embodiment, the distal portion of each finger 210 is up to 3 mm in width. In one embodiment, the distal portion of each finger is approximately 1 mm in width. Each of the fingers need not be identically or similarly dimensioned. For example, one of the fingers may be wider than another. For example, the distal portion of one of the fingers may be 2 mm in width and another of the fingers may be 1 mm in width. The distal portion of one or more of the fingers may be narrower in width than other portions of the fingers. In various embodiments, however, this is not necessary. For example, in various embodiments, each finger 210 is similarly dimensioned in width throughout its length.

As described above, workpiece 137 has a laser side 150 and an exit side 160. During cutting, molten material, slag or other undesirable material or debris may have a tendency to be produced and/or collect substantially along or near an area of workpiece 137 being cut by laser apparatus 140. Referring to FIGS. 3-7, in various embodiments, laser cutting system 135 includes a first suction system 170 in fluid communication with the aperture 260 in one or more fingers 210 and adapted to suction various fumes, debris, and other products of the cutting process from and near laser side 150 of workpiece 137. In various embodiments, aperture 260 is in fluid communication with an at least partial vacuum source via the conduit 270 in one or more fingers 210.

Figure 5:
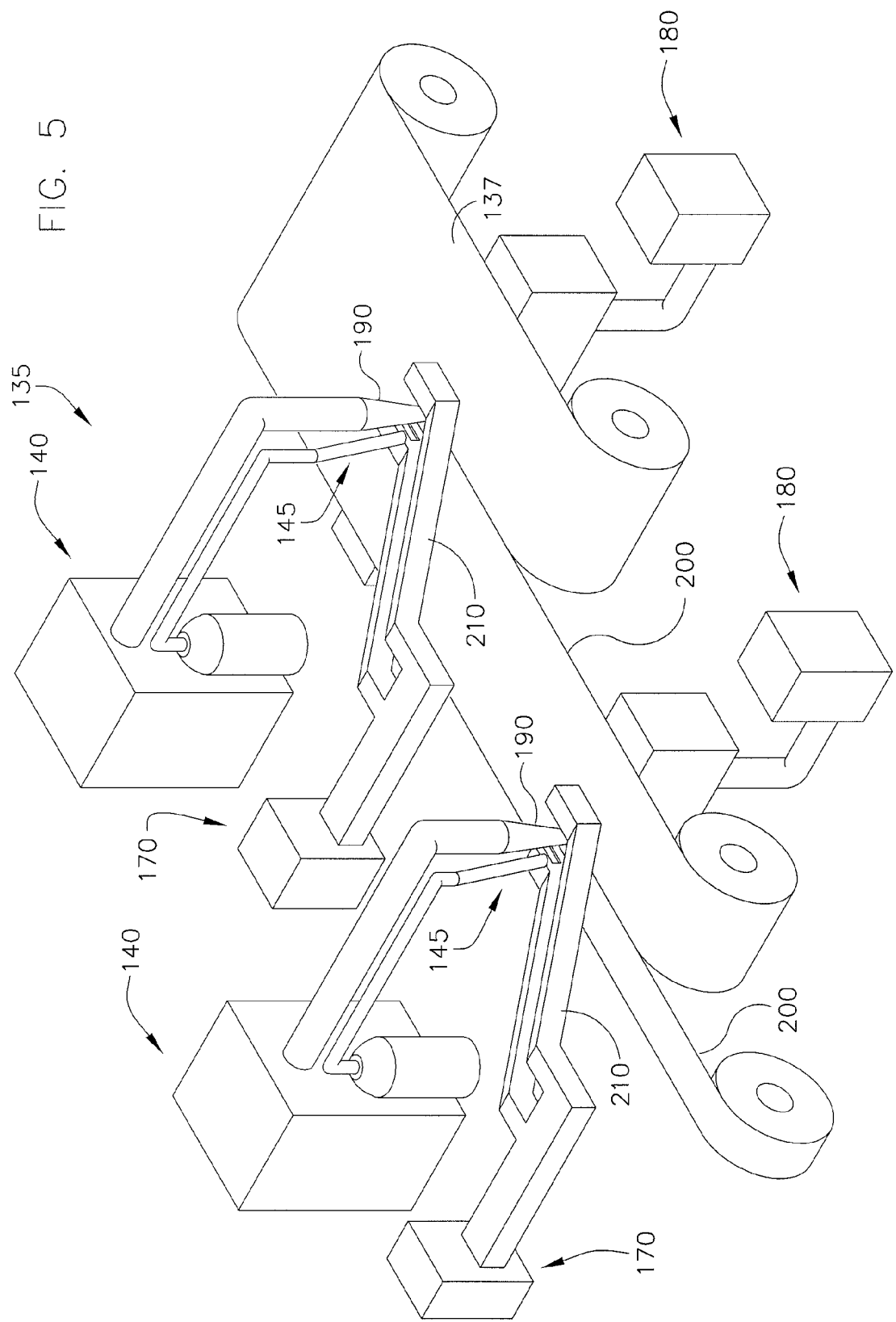
FIG. 5 is an isometric view of a portion of a laser cutting system according to a second exemplary embodiment.
Figure 6:
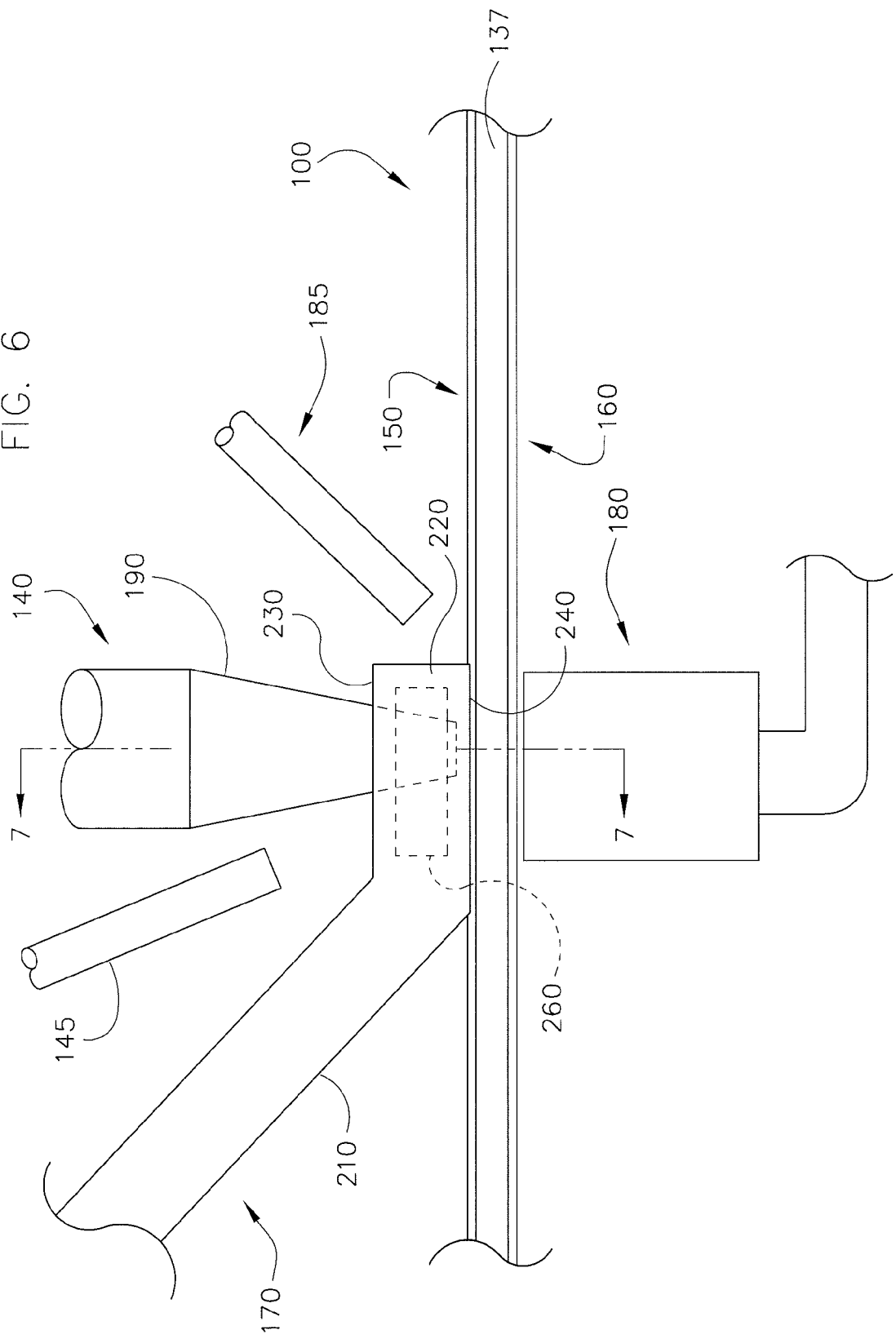
FIG. 6 is a side view of a portion of a laser cutting system according to an exemplary embodiment.
Figure 7:
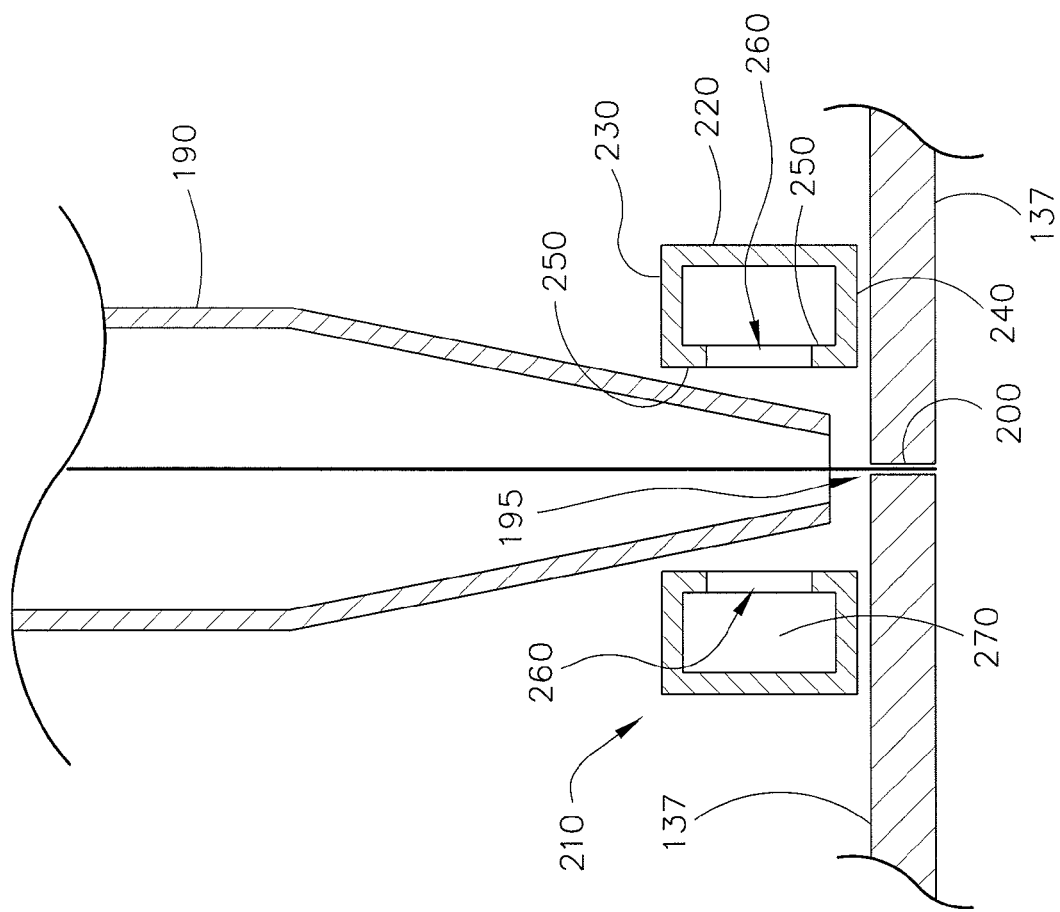
FIG. 7 is a sectional view of a portion along line 7-7 in FIG. 6.

In various embodiments, as shown in FIGS. 3 and 5-6, laser cutting system 135 also includes a second suction system 180 positioned and adapted to suction various fumes, debris and other undesirable material and products of the cutting process from and near exit side 160 of workpiece 137. For example, second suction system 180 may include at least one conduit defining at least one opening near the laser contact point in fluid communication with an at least partial vacuum system and at least partially positioned or provided adjacent exit side 160 of workpiece 137, for suctioning various fumes, debris, and other products of the cutting process from and around the laser contact point.

In various embodiments, as illustrated in FIGS. 3-6, laser cutting system 135 includes a third suction system 185 adapted to suction various material dispersed upstream of laser contact point 195 and/or collecting and/or collected in, around, and/or on one or more of the fingers 210. In various embodiments, third suction system 185 is located proximate to laser contact point 195. However, the third suction system 185 may be located upstream, downstream, and/or to either side of laser contact point 195. In various embodiments, the third suction system includes at least one conduit defining at least one opening near the laser contact point in fluid communication with an at least partial vacuum system.

Referring again to FIGS. 3-7, in various embodiments, laser cutting system 135 includes a gas apparatus 145 operatively associated with laser apparatus 140, whereby gas apparatus 145 provides for the introduction of gas against laser side 150 of workpiece 137 at or about laser contact point 195. In various embodiments, the gas apparatus may direct gas against the exit side of the workpiece. In various embodiments, gas apparatus 145 directs a jet of gas substantially on, in or around laser contact point 195. As a portion of workpiece 137 is cut using laser apparatus 140, the cut material is carried or otherwise dispersed away from laser contact point 195 via the gas. In one embodiment, the gas utilized comprises oxygen. In various embodiments, oxygen used as a gas in the range of 5 to 50 psi provides a suitable cut at a suitable cutting speed. However, other gases such as nitrogen may be utilized. In various embodiments, nitrogen used as a gas in the range of 25-150 psi may be utilized. In various embodiments, the introduction of a gas on or near a cut joint of the workpiece also results in an improvement in the formation of the cut by supplying additional energy to the laser cutting process.

Referring to FIG. 5, in various embodiments, cutting system 135 includes multiple laser apparatus 140. In various embodiments, cutting system 135 includes multiple first, second, and/or third suction systems 170/180/185 positioned and adapted to suction various fumes, debris, and other products of the cutting process from the laser side and/or the near exit side 160 of workpiece 137. In such embodiments, a sheet of conductor formed with multiple electrode members may be simultaneously cut into individual electrodes.

Figure 8B:
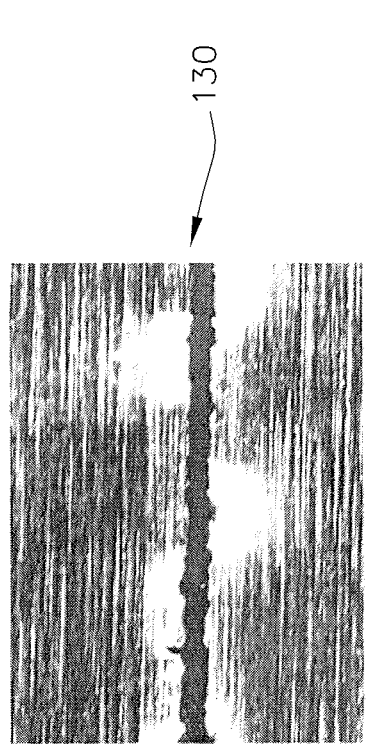
FIGS. 8A and 8B are top views of conductor cut using a system according to an exemplary embodiment.
Figure 8A:
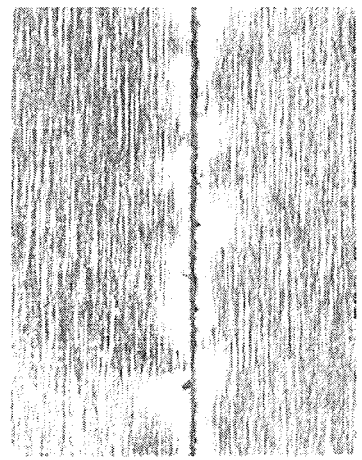
Figure 9B:
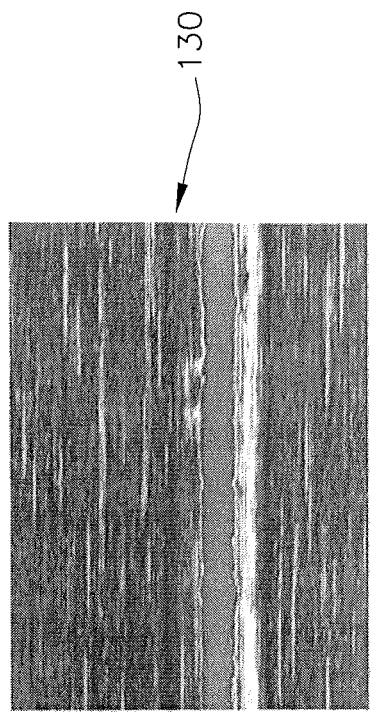
FIGS. 9A and 9B are top views of conductor cut using a system according to an exemplary embodiment.
Figure 9A:
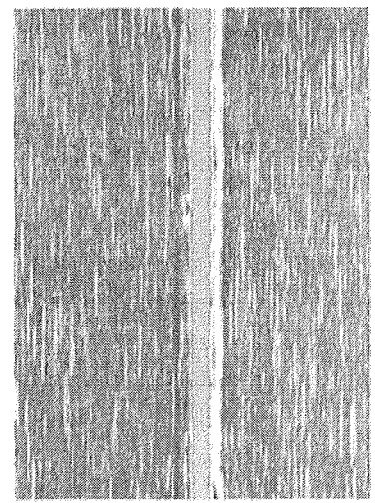

The present inventions allow high-quality, reproducible cutting at an increased speed via laser. FIGS. 8A and 8B are top views, magnified 30 times and 75 times respectively, of a conductor 130 comprising copper cut at a cutting speed of approximately 26.5 meters per minute using a 500 watt laser and nitrogen as the gas at 40 psi. FIGS. 9A and 9B are top views, magnified 30 times and 75 times respectively, of a conductor 130 comprising copper cut at a cutting speed of approximately 26.5 meters per minute using a 350 watt laser and oxygen as the gas at 25 psi. FIGS. 10A and 10B are top views, magnified 30 times and 75 times respectively, of a conductor 130 comprising aluminum, cut at a cutting speed of approximately 26.5 meters per minute using a 300 watt laser and nitrogen as the gas at 100 psi. FIGS. 11A and 11B are top views, magnified 30 times and 75 times respectively, of a conductor comprising aluminum cut at a cutting speed of approximately 26.5 meters per minute using a 125 watt laser and oxygen as the gas at 25 psi. As depicted in FIGS. 8A through 11B, the use of oxygen as the gas at 25 psi in connection with one embodiment of the present invention generally resulted in a cleaner cut of the conductor 130 than nitrogen gas. However, it should be appreciated that the use of nitrogen as a gas also provided an acceptable cut.

While this invention has been described in conjunction with the exemplary embodiments outlined above, various alternatives, modifications, variations, improvements and/or substantial equivalents, whether known or that are or may be presently foreseen, may become apparent to those having at least ordinary skill in the art. Accordingly, the exemplary embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

What is claimed is:

1. A workpiece cutting apparatus comprising:
   a stationary laser source;
   a first suction system; and
   a first finger that guides a workpiece as the workpiece is moved past the laser source, the first finger including a first end provided adjacent a point where a laser from the laser source cuts the workpiece;
   wherein the first end of the first finger includes an aperture in fluid communication with the first suction system; and
   wherein the workpiece comprises a thin metal sheet provided in a roll, and the laser source cuts the thin metal sheet from the roll in a continuous process.

2. The apparatus of claim 1, wherein the first finger acts as a conduit between the aperture and the first suction system, and the first finger includes a bottom surface that is parallel to an upper surface of the workpiece thereunder and that is elongated in a direction of movement of the workpiece.

3. The apparatus of claim 1, further comprising a second finger having a first end provided adjacent the point where the laser from the laser source cuts the workpiece, the first end of the second finger comprising an aperture.

4. The apparatus of claim 3, wherein the point where the laser from the laser source cuts the workpiece is between the first end of the first finger and the first end of the second finger.

5. The apparatus of claim 4, wherein the second finger defines a conduit between the aperture of the second finger and the first suction system.

6. The apparatus of claim 1, further comprising a second suction system having a first end provided adjacent the point where the laser from the laser source cuts the workpiece on an exit side of the workpiece; and
   wherein the second suction system comprises at least one conduit defining at least one opening adjacent the point where the laser from the laser source cuts the workpiece.

7. The apparatus of claim 1, wherein the workpiece includes a first side facing the laser source and a second side opposite the first side, and further comprising a third suction system provided adjacent the point where the laser from the laser source cuts the workpiece on the first side.

8. The apparatus of claim 7, wherein the third suction system comprises at least one conduit defining at least one opening adjacent the point where the laser from the laser source cuts the workpiece.

9. The apparatus of claim 1, further comprising an apparatus configured to direct a jet of gas substantially around the point where the laser from the laser source cuts the workpiece.

10. The apparatus of claim 9, wherein the apparatus provides at least one of oxygen or nitrogen.

11. A workpiece cutting apparatus comprising:
    a laser configured to cut a workpiece at a stationary laser contact point; and
    at least one member having a first end provided adjacent the laser contact point and which guides the workpiece as the workpiece passes the laser contact point, the at least one member having a first end that includes an opening positioned adjacent the laser contact point such that the at least one member is configured to remove debris from an area adjacent the laser contact point by suction;
    the workpiece comprises a thin metal sheet provided in a roll, and the laser source cuts the thin metal sheet from the roll in a continuous process.

12. The apparatus of claim 11, further comprising a second member having a first end that includes an aperture provided adjacent the laser contact point, wherein the second member is configured to remove debris from an area adjacent the laser contact point by suction, and wherein the laser contact point is between the first member and the second member, and wherein the first member and the second member extend substantially parallel with each other.

13. The apparatus of claim 11, wherein the laser contact point is between the opening of the first member and the opening of the second member.

14. The apparatus of claim 11, further comprising a gas apparatus configured to direct a jet of gas substantially around the laser contact point.

15. A method of cutting a workpiece comprising:
    providing a workpiece;
    providing a laser source configured to cut the workpiece with a laser that impinges the workpiece at a stationary laser contact point;
    providing at least one finger having an end provided adjacent the laser contact point to guide the workpiece as the workpiece passes the laser contact point;
    cutting the workpiece with the laser; and
    suctioning debris from an area adjacent the laser contact point on a laser side of the workpiece using the at least one finger;
    wherein the workpiece comprises a thin metal sheet provided in a roll, and the thin metal sheet from the roll is cut with the laser in a continuous process.

16. The method of claim 15, wherein the end of the at least one finger comprises an aperture in fluid communication with a vacuum source.

17. The method of claim 15, further comprising suctioning debris from an area adjacent the laser contact point on a side of the workpiece opposite the laser source.

18. The method of claim 15, further comprising providing a gas around the laser contact point.

* * * * *